(12) United States Patent
Nyhus et al.

(10) Patent No.: US 6,193,464 B1
(45) Date of Patent: Feb. 27, 2001

(54) ACTIVE BRAKE CONTROL FOR ROTOR/ WING AIRCRAFT

(75) Inventors: Daniel A. Nyhus, Gilbert; Stephen S. Osder, Scottsdale, both of AZ (US)

(73) Assignee: McDonnell Douglas Helicopter Company,, Mesa, AZ (US)

( * ) Notice: Subject to any disclaimer, the term of this patent is extended or adjusted under 35 U.S.C. 154(b) by 0 days.

(21) Appl. No.: 09/204,654

(22) Filed: Dec. 2, 1998

(51) Int. Cl.$^7$ ...................................................... B63H 3/00
(52) U.S. Cl. ............................ 416/32; 416/44; 416/169 R
(58) Field of Search .................................. 416/32, 43, 44, 416/169 R, 170 R; 415/14, 15, 18, 30, 123; 244/7 A, 7 R; 118/1.11 E

(56) References Cited

U.S. PATENT DOCUMENTS

| | | | |
|---|---|---|---|
| 4,678,401 | * 7/1987 | Bradford et al. | 416/169 R |
| 4,762,196 | 8/1988 | Harado | 180/197 |
| 5,454,530 | 10/1995 | Rutherford | 244/7 A |
| 5,646,523 | * 7/1997 | Kaiser et al. | 324/207.25 |

* cited by examiner

Primary Examiner—Edward K. Look
Assistant Examiner—Hermes Rodriguez
(74) Attorney, Agent, or Firm—Bryan Cave LLP

(57) ABSTRACT

The present invention comprises a feedback-controlled braking apparatus that applies a modulated braking force that smoothly decelerates a rotating shaft such that it comes to rest at a precise location. According to a preferred embodiment of the present invention the rotor hub of a rotor/wing aircraft is coupled to a hydraulically actuated friction brake, such as a conventional disk brake. The disk brake caliper is supplied with fluid pressure from an electrically actuated servo valve which, in turn, is controlled by an electronic controller. A sensor monitors the angular position and velocity of the rotor main shaft. The velocity and position information is provided to the controller, which modulates the brake pressure as required to bring the rotor to a stop at exactly the right orientation relative to the aircraft. By providing active brake control, the present invention enables the rotor of a rotor/wing aircraft to be decelerated and stopped smoothly and precisely in the desired position in the minimum time possible.

18 Claims, 5 Drawing Sheets

ACTIVE BRAKE CONTROL FOR ROTOR/WING AIRCRAFT

BACKGROUND OF THE INVENTION

This application relates generally to aircraft capable of flight in both a rotary wing and fixed wing modes of flight and, more particularly, to apparatus for controlling the motion of the rotor/wing thereof.

Rotor/wing aircraft such as the aircraft disclosed in U.S. Pat. No. 5,454,530 titled "Canard Rotor/Wing" are capable of operation in both a helicopter and a fixed-wing mode of flight. In order to achieve this dual mode flight, a rotor/wing aircraft is equipped with a rotating hub, similar to the rotating hub of a helicopter, to which are attached a plurality of rotor blades extending radially outward from the hub. In the first flight regime the hub and rotor blades are rotated, in a manner similar to that of a helicopter. This enables the aircraft to move vertically, hover, and fly translationally at relatively slow speeds. In the second flight regime, the rotor is locked with the rotor blades positioned to operate as fixed wings, thereby enabling the aircraft to fly at relatively high speed configured as a conventional fixed-wing aircraft.

Historically a major obstacle to the practical implementation of rotor/wing aircraft has been the difficulties associated with transitioning between the two flight regimes, including the difficulties associated with stopping the rotating rotor blades quickly and indexing the blades precisely in position for fixed wing flight. Prior art apparatus for stopping and locking the rotor involved use of a spring-loaded shock absorber which decelerated the rotating hub during the initial stroke of the shock absorber and a rebound stop which locked the hub in position on the rebound stroke of the shock absorber. Disadvantages of the prior art approach include the size and weight of a shock absorber necessary to absorb the energy in the rotating hub and the impact loads imparted to the rotor/wing and other aircraft components.

Accordingly, what is needed is a compact, lightweight apparatus that quickly and efficiently decelerates and indexes a rotating rotor hub to an exact location without imparting unnecessary shock loads to the aircraft.

SUMMARY OF THE INVENTION

The present invention comprises a feedback-controlled braking apparatus that applies a modulated braking force that smoothly decelerates a rotating shaft such that it comes to rest at a precise location. According to a preferred embodiment of the present invention the rotor hub of a rotor/wing aircraft is coupled to a hydraulically actuated friction brake, such as a conventional disk brake comprising a brake caliper and disk brake rotor attached to the rotor main shaft. The brake caliper is supplied with fluid pressure from an electrically actuated servo valve which, in turn, is controlled by an electronic controller. A pair of sensors monitor the angular position of the rotor main shaft from which a computer calculates the angular velocity of the rotor main shaft (by computing the time rate of change of the angular position measurement). The velocity and position information is provided to the controller, which modulates the brake pressure as required to bring the rotor to a stop at exactly the right orientation relative to the aircraft. Other features such as a mechanical lock pin may be provided in order to lock the rotor main shaft in position once the brake has arrested all rotational velocity. The brake controller and mechanical lock pin device may also be configured to allow more than one "correct" orientation, such that the rotor can be locked with any one of the plurality of blades in any one of a plurality of locations. By providing active brake control, the present invention enables the rotor of a rotor/wing aircraft to be decelerated and stopped smoothly in the minimum time possible within the design stress limits of the rotor/blade/main shaft and other components and without the weight and volume occupied by prior art rotor locking apparatus.

BRIEF DESCRIPTION OF THE DRAWING

The present invention will be better understood from a reading of the following detailed description, taken in conjunction with the accompanying drawing figures in which like references designate like elements and, in which.

DETAILED DESCRIPTION

Figure 1:
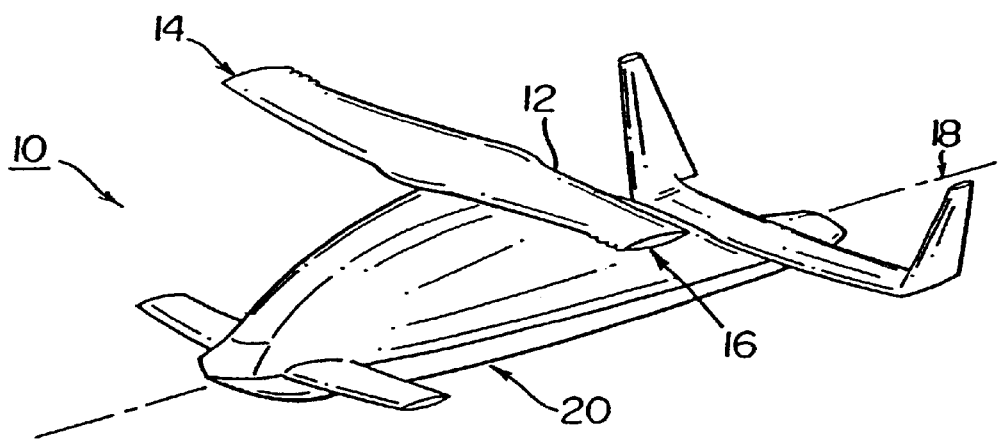
FIG. 1 is a perspective diagrammatic view of a rotor/wing aircraft with the rotor/wing locked with the rotor blades orthogonal to the longitudinal axis of the aircraft.

The drawing figures are intended to illustrate the general manner of construction and are not to scale. In the description and in the claims the terms left, right, front and back and the like are used for descriptive purposes. However, it is understood that the embodiment of the invention described herein is capable of operation in other orientations than is shown and the terms so used are only for the purpose of describing relative positions and are interchangeable under appropriate circumstances.

Figure 2:
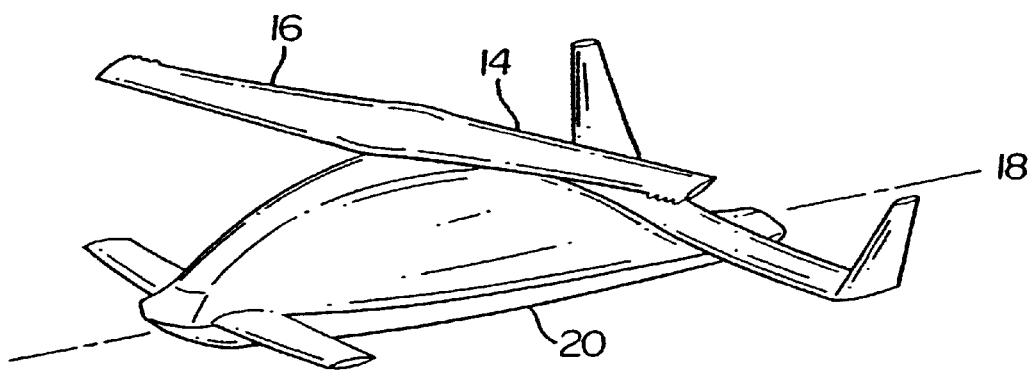
FIG. 2 is a perspective diagrammatic view of a rotor/wing aircraft with the rotor/wing locked with the rotor blades at an acute angle with respect to the longitudinal axis of the aircraft.
Figure 3:
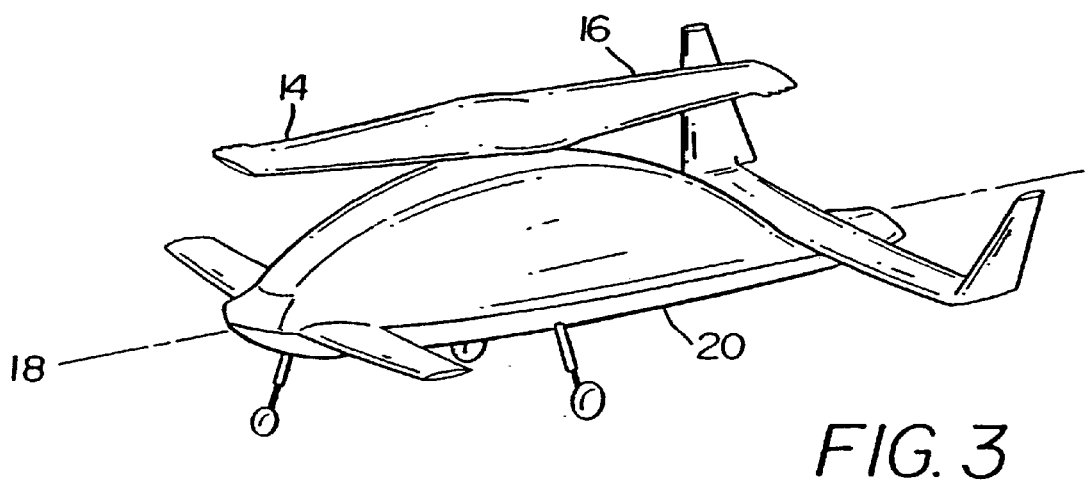
FIG. 3 is a perspective diagrammatic view of a rotor/wing aircraft with the rotor/wing locked with the rotor blades parallel to the longitudinal axis of the aircraft.

A rotor/wing aircraft 10 that may advantageously employ an active brake control apparatus incorporating features of the present invention is disclosed in the aforementioned U.S. Pat. No. 5,454,530, incorporated herein by reference, and is depicted in FIGS. 1–3 hereof. FIG. 1 depicts the rotor wing aircraft 10 in a configuration adapted to relatively low speed fixed-wing flight in which the rotor/wing 12 is locked with the rotor blades 14 and 16 orthogonal to the longitudinal axis 18 of the aircraft fuselage 20. FIG. 2 depicts the rotor/wing aircraft 10 in a configuration adapted to high speed flight in which the rotor/wing 12 is locked with the rotor blades 14 and 16 positioned at an acute angle to the longitudinal axis 18 of the aircraft fuselage 20. FIG. 3 depicts the rotor/wing in a stowed position in which the rotor/wing 12 is locked with the rotor blades 14 and 16 substantially aligned with longitudinal axis 18. As is implicit from the foregoing discussion of the dual-mode capabilities of the rotor/wing aircraft 10, in the helicopter mode of flight, the rotor/wing 12 is rotating continuously to provide lift and aerodynamic control of the aircraft necessary for stable flight.

Figure 4:
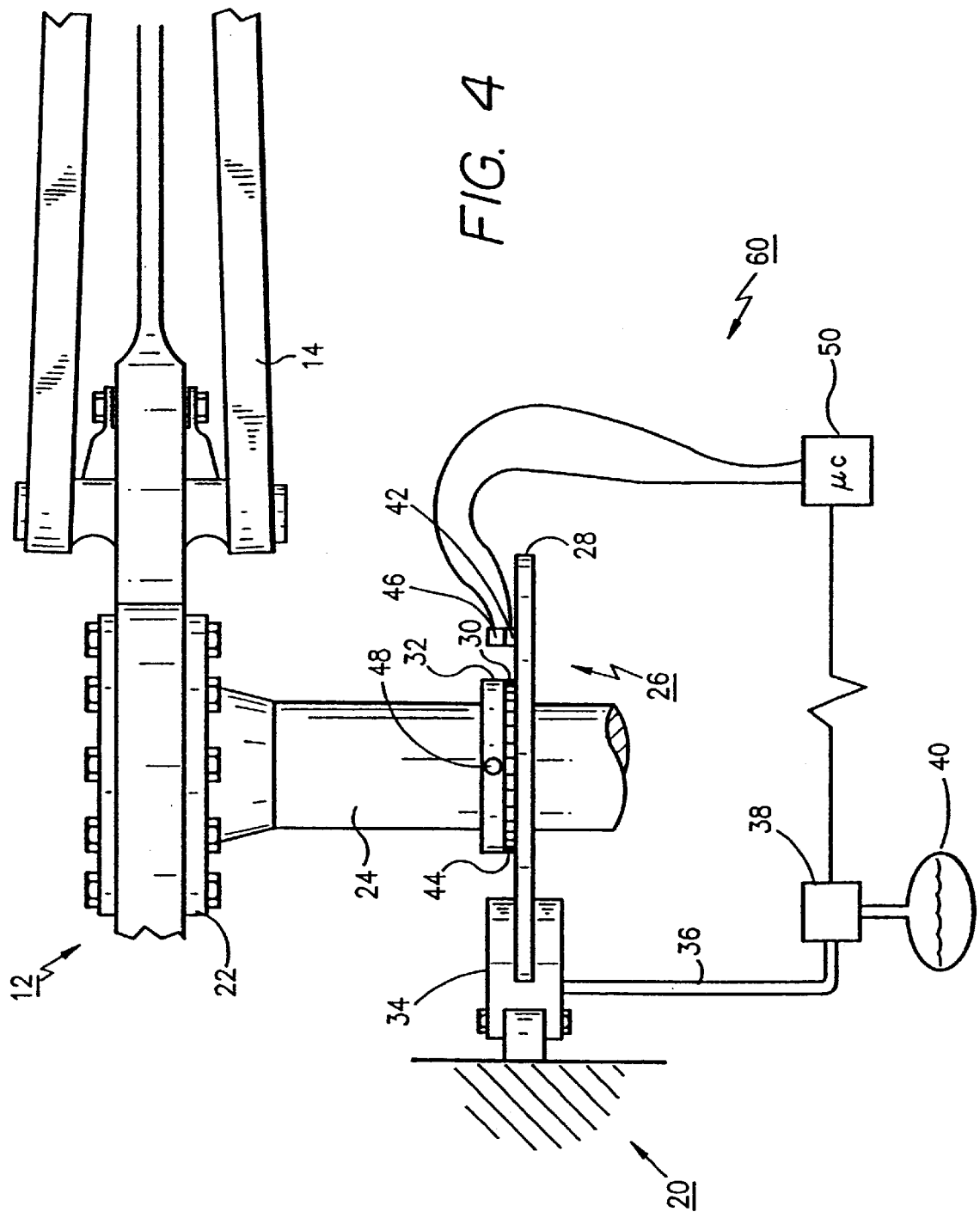
FIG. 4 is a partial schematic cross-sectional view of a rotor/wing incorporating an illustrative active brake control apparatus in accordance with the present invention.
Figure 5:
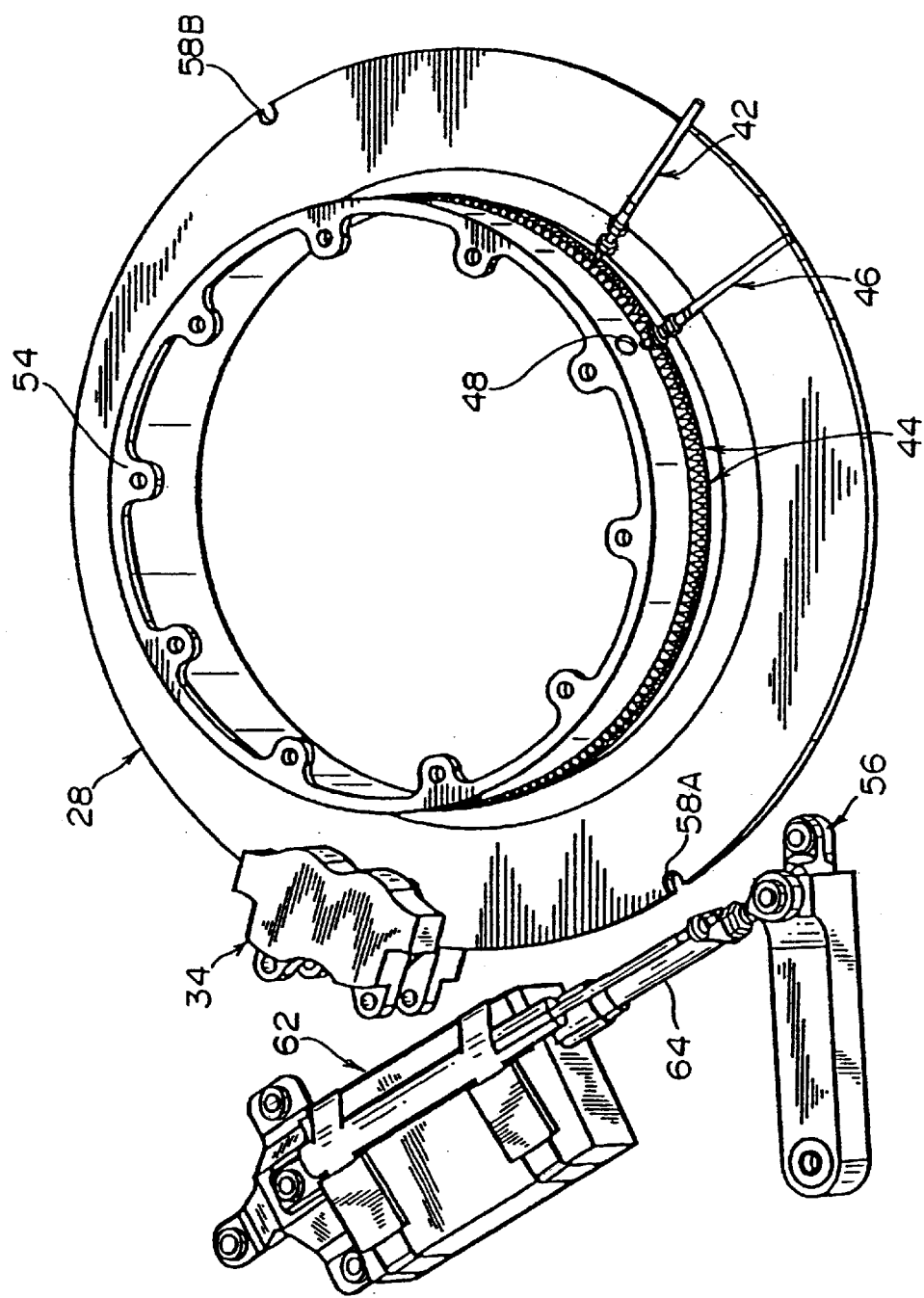
FIG. 5 is a partial perspective view of selected components of the active brake control apparatus of FIG. 4.

FIG. 4 depicts in partial schematic a portion of an illustrative rotor/wing 12 incorporating features of the present invention. FIG. 5 shows in greater detail the mechanical components of the illustrative active brake control apparatus 60. With reference to FIGS. 4 and 5, rotor/wing 12 comprises a rotor hub 22, to which are attached a plurality of rotor blades such as rotor blade 14. Rotor hub 22 is rotatingly supported in fuselage 20 by means of a rotatable main shaft 24, which is adapted to allow rotor hub 22 to spin relative to fuselage 20 while providing axial constraints to enable rotor/wing 12 to fully support fuselage 20 when aircraft 10 is operating in the helicopter mode of flight. Attached to main shaft 24 is a disk brake assembly 26 comprising a torque applying surface, such as a brake drum, band brake surface, or as in the illustrative embodiment, a brake disk 28, toothed flange 30, and holed flange 32. Brake disk 28 may be attached to main shaft 24, or directly to rotor hub 22, in conventional fashion for example by a bolt flange 54.

Disposed about brake disk 28 is brake caliper 34 having conventional friction brake pads (not shown). Brake caliper 34 is, in turn, fixed directly or indirectly to fuselage 20 such that when brake caliper applies a decelerating torque to brake disk 28, the force is reacted against fuselage 20. Fluid pressure is supplied to brake caliper 34 from servo valve 38 via control pressure line 36. Servo valve 38 receives high pressure fluid from a source of high pressure fluid 40 and modulates the pressure delivered to brake caliper 34 as described more fully hereinafter. Fluid pressure received by brake caliper 34 causes brake caliper 34 to apply a force urging the friction brake pads against the surface of brake disk 28, which apply a decelerating torque in conventional fashion to brake disk 28, which causes brake disk 28 and with it main shaft 24 to decelerate and eventually stop. Although the illustrative embodiment utilizes a disk brake, any means of applying a friction force, such as by means of a drum or band brake having a friction surface (hereinafter collectively referred to as friction linings) is considered within the scope of the present invention.

A position/velocity sensor 42 detects the passage of a plurality of teeth 44 formed along the circumference of toothed flange 30. Position/velocity sensor 42 may comprise a conventional hall-effect sensor, but preferably comprises a fiber optic sensor which can detect the passage of each of the plurality of teeth 44 irrespective of the instantaneous angular velocity of toothed flange 30. In a preferred embodiment of the present invention, the plurality of teeth 44 comprise 180 teeth disposed evenly every two degrees around the circumference of toothed flange 30. The plurality of teeth 44 in cooperation with position/velocity sensor 42 provide a fine-resolution signal impulse every two degrees of rotor rotation to an electronic control module such as microcontroller 50. Microcontroller 50 receives the fine resolution displacement information from position/velocity sensor 42 and divides displacement by a programmed time interval to calculate average velocity over the programmed time interval. The resolution achieved is dependent upon the frequency of the clock used to time the interval between the pulses. Typically, a position resolution of better than 0.1 degree is obtainable with state of the art microcontroller timing techniques. Alternatively, position/velocity sensor 42 may incorporate its own internal logic so that the signal provided by sensor 42 is convertible into velocity directly without the need to perform the summing of timer clock pulses. That internal logic can also include the microcontroller or equivalent circuitry that can provide an accurate output indicative of the position, velocity, and acceleration parameters needed by the active brake control algorithm.

In addition to position/velocity sensor 42, there is provided a second position/velocity sensor 46, which detects the passage of a single hole 48 or other feature in holed flange 32 to provide a once-per-revolution index signal to microcontroller 50. This coarse resolution once-per-revolution signal may be used to provide angular velocity data when the rotor/wing 12 is rotating at high speeds and is used at lower speeds to synchronize the signals from position/velocity sensor 42 with the known orientation of the blades 14 and 16 of the rotor wing 12 relative to hole 48, such that rotor/wing 12 can be stopped with blades 14 and 16 in a precise position.

Figure 6:
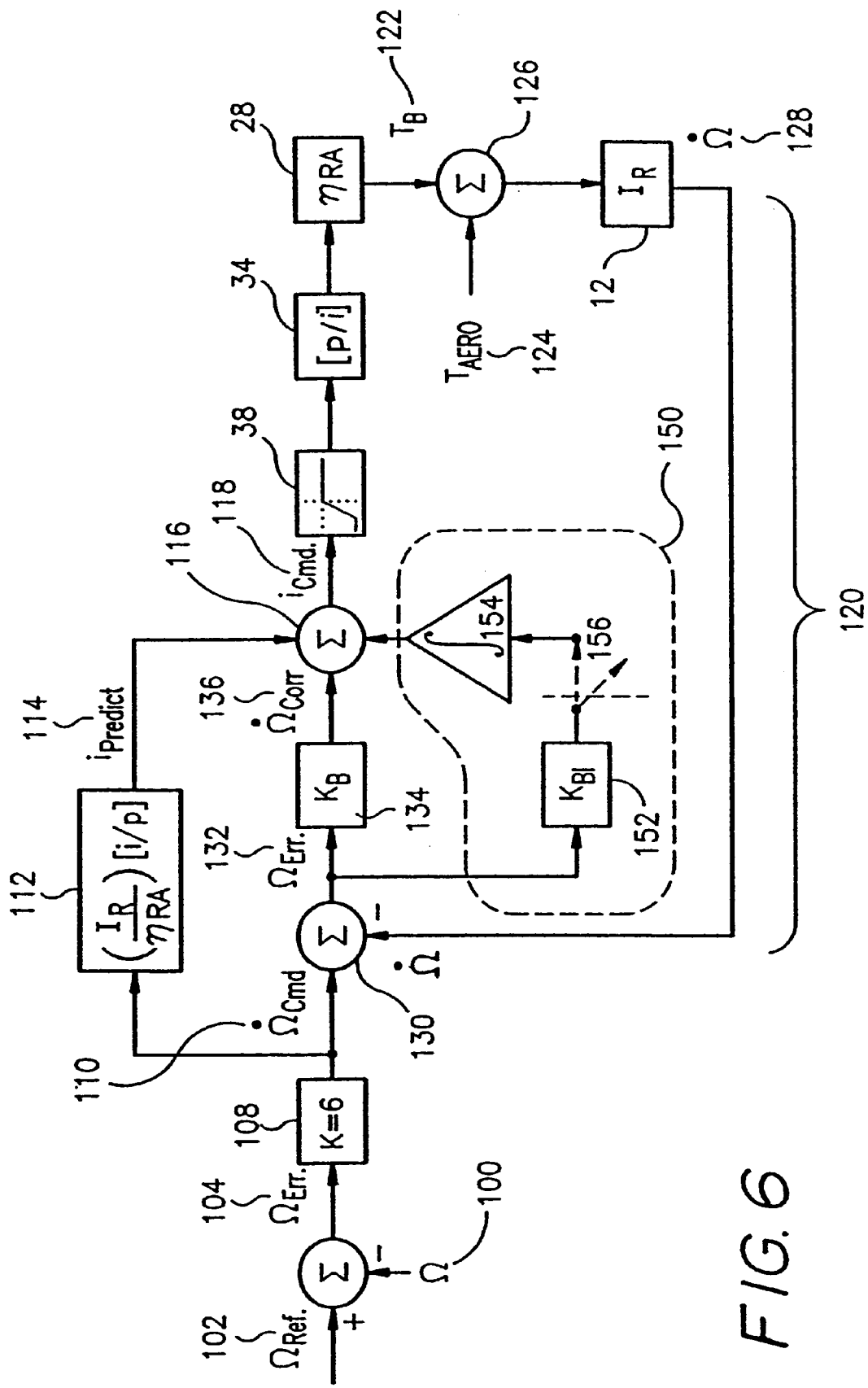
FIG. 6 is a simplified block diagram of the logic of an exemplary active brake control in accordance with the present invention.

FIG. 6 is a simplified block diagram of the logic of an illustrative active brake control apparatus 60 incorporating features of the present invention. When the aircraft 10 has reached the appropriate forward velocity such that it is desirable to lock the rotating rotor/wing in position for fixed wing flight, the aircraft flight control system diverts all main engine power from the rotor/wing drive system to the cruise nozzle, which is adapted to provide forward thrust to the aircraft. Simultaneously, active brake control apparatus 60 is activated so as to stop and index the rotor/wing 12 for fixed-wing flight. Upon receipt of the stop command, controller 50 determines the instantaneous velocity $\Omega$ (reference 100) and subtracts it from the reference velocity $\Omega_{Ref.}$ (reference 102) to produce a velocity error signal $\Omega_{Err.}$ (reference 104). The reference velocity $\Omega_{Ref.}$ is set to zero when $\Omega$ is greater than $\Omega_{Crit.}$ and is a function of the position error (as defined hereinafter) when $\Omega$ is less than $\Omega_{Crit.}$. It should be noted that $\Omega_{Crit.}$ is somewhat arbitrarily chosen, but typically is an angular velocity from which the rotor/wing can be stopped in less than one revolution within the design constraints of the brake control apparatus. In the illustrative embodiment the reference velocity $\Omega_{Crit.}$ was chosen to be 1 radian per second. The position error $\psi_{Err.}$ is equal to the difference between the current angular position $\psi$ of the rotor/wing and the position at which the blades must come to rest $\psi^{Ref}$. For velocities less than $\Omega_{Crit.}$ the value of $\Omega_{Ref.}$ is equal to the position error $\psi_{Err.}$ multiplied by a fixed gain $K_\psi$ minus a fixed bias "B" (the bias "B" is necessary because the system can only apply torque in one direction, and therefore a bias is necessary to ensure that the angular velocity is zero when the position error is zero). Thus, as the rotor/wing 12 approaches the rest position, the value of $\Omega_{Ref.}$ decreases until at just before the rest position (as determined by the bias) $\Omega_{Ref}$ is equal to zero.

The velocity error signal 104 is amplified by a fixed gain in amplifier block 108 to produce a commanded acceleration $\dot{\Omega}_{Cmd.}$ (reference 110), which is the acceleration (deceleration) desired by the control system. The commanded acceleration is amplified by a fixed gain in amplifier block 112 to produce a control current $I_{predict}$ (reference 114). As indicated in FIG. 6, the gain in amplifier block 112 is a function of (1) the design coefficient of friction "η" of the brake pads of brake caliper 34, the effective brake area "A" and the brake lever arm "R" which combine to produce a total brake torque "T"; (2) the mass moment of inertia of the rotor/wing 12 about the main shaft; and (3) a transfer function which represents the current to pressure function of servo valve 38 acting on brake caliper 34. Thus, collectively, the commanded acceleration signal $\dot{\Omega}_{Cmd.}$ multiplied by the gain in amplifier block 112 produces a control current $I_{predict}$, which, when inputted into servo valve 38 causes servo valve 38 to apply the appropriate pressure to brake caliper 34 to cause it to exert precisely the right torque necessary to produce the desired deceleration. Thus, if there are no errors in the system, $I_{predict}$ enters summing block 116 and is neither increased nor decreased so that the command current $I_{Cmd.}$ (reference 118) is equal to $I_{predict}$. The command current $I_{Cmd.}$ actuates servo valve 38, which applies pressure to brake caliper 34, which in turn applies a force to brake rotor 28, which in turn applies a torque $T_B$ (reference 122) to rotor/wing 12. The brake torque $T_B$ acts together with the aerodynamic torque $T_{Aero}$ (reference 124) being applied to rotor/wing 12 to produce a net torque (represented by summing block 126) that causes the rotor/wing 12 to decelerate at a rate $\dot{\Omega}$ (reference 128) proportional to the moment of inertia $I_R$ of the rotor/wing 12. It should be noted that $T_{Aero}$ comprises both the non-cyclic aerodynamic drag and the cyclic windmill torque acting on the rotor/wing 12 and thus has both a cyclic and a non-cyclic component.

As noted above if all of the values affecting the gain in amplifier block 112 are known with perfect accuracy and there are no other errors or unknowns in the system, brake caliper 34 is able to apply exactly the appropriate torque necessary to stop rotor/wing at exactly the right position in essentially an open-loop stopping sequence. It is difficult, however, to know all of the values affecting the gain in amplifier block with perfect accuracy. Accordingly, a feedback loop 120 is incorporated into the logic circuitry of active brake control apparatus 60. In the feedback control loop 120, the commanded acceleration $\dot{\Omega}_{Cmd.}$ is compared with the instantaneous acceleration $\dot{\Omega}$ (obtained by computing the rate of change of the angular velocity measurement) to produce an acceleration error signal, which is used to correct the control current $I_{predict}$ applied to servo valve 38. As shown in FIG. 6, feedback loop 120 comprises summing block 130 which subtracts the measured instantaneous acceleration $\dot{\Omega}$ from the commanded acceleration $\dot{\Omega}_{Cmd.}$ to produce an acceleration error signal $\dot{\Omega}_{Cmd.}$ (reference 132). The acceleration error signal $\dot{\Omega}_{Cmd.}$ is then multiplied by a fixed gain $K_B$ by gain block 134 to produce an acceleration correction signal $\dot{\Omega}_{corr.}$ 136. Acceleration correction signal $\dot{\Omega}_{corr.}$ is then added to the control current $I_{predict}$ as represented by summing block 116 to produce a corrected command current $I_{Cmd.}$ which is applied to servo valve 38. As noted previously, if there are no errors in the system, brake caliper 34 will apply precisely the right torque to produce the commanded deceleration. Under these circumstances, the instantaneous acceleration $\dot{\Omega}$ will be equal to the commanded acceleration $\dot{\Omega}_{Cmd.}$ and the acceleration error signal will be zero. If, however, the instantaneous acceleration $\dot{\Omega}$ is not equal to the commanded acceleration $\dot{\Omega}_{Cmd.}$, for example if the magnitude of the instantaneous acceleration is less than the commanded acceleration, such that the rotor/wing is not decelerating as quickly as desired, an error signal will be generated that will result in an increase in the command current supplied to servo valve 38 with a concomitant increase in the pressure and torque applied by brake caliper 34.

Additional control elements such as a conventional gain integrator block comprising gain block 152 and integrator 154 may be added to the feedback loop 120 to improve precision of the system. In the illustrative embodiment an additional logic block 156 is added to prevent wind-up of the integrator by disengaging the integrator input if $I_{Cmd.}$ is greater than zero (indicating the rotor/wing is already decelerating faster than commanded) or if $I_{Cmd.}$ is greater than $I_{Max}$ the saturation current of servo valve 38.

Figure 7:
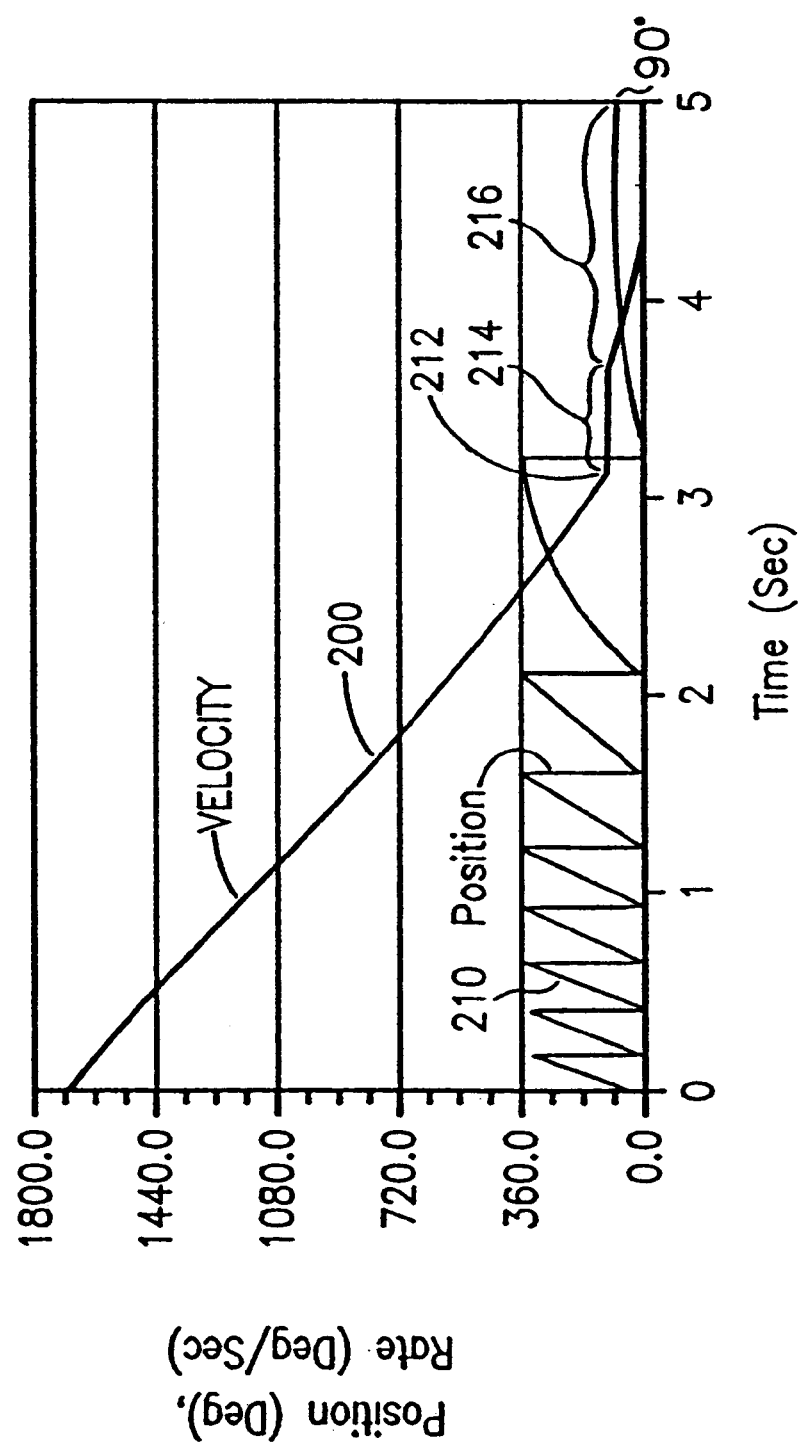
FIG. 7 is a graphical illustration of a rotor/wing as it is decelerated by an active brake control incorporating features of the present invention.

FIG. 7 is a graphical illustration of a rotor as it is decelerated by an active brake control incorporating features of the present invention. As can be determined from an inspection of FIG. 7, as the angular velocity 200 of rotor/wing 12 decelerates from a magnitude well above $\Omega_{Crit}$ the deceleration is relatively constant which produces a relatively linear decrease in angular velocity. The position of the rotor/wing 12 is shown as alternating from 0 to 360 degrees with a decaying displacement rate indicative of a linearly decreasing angular velocity. When the angular velocity $\Omega$ reaches $\Omega_{Crit}$ (reference 212), the illustrative active brake control determines the position reference $\psi_{Ref.}$, the current position $\psi$, and the position error $\psi_{Err.}$. For the brake control of FIG. 7, $\psi_{Ref.}$ was either 90 degrees or 270 degrees (i.e. with rotor/wing 12 orthogonal to the longitudinal axis 18 with the "right" wing 14 on the right side of fuselage 20 (90 degrees) or with the "right" wing 14 on the left side of fuselage 20 (270 degrees)) with the decision based upon the position of rotor/wing at the moment angular velocity $\Omega$ reaches $\Omega_{Crit}$. If the actual position is less than 90 degrees or greater than 270 degrees, then $\psi_{Ref}$ is set to 90 degrees. If the actual position is greater than 90 degrees but less than 270 degrees, then $\psi_{Ref}$ is set to 270 degrees. In the case represented in FIG. 7, the actual position was less than 90 degrees, therefore the rotor/wing was caused to stop at $\psi_{Ref}$=90 degrees. Once the position error is determined, the active brake control applies (or in the case of FIG. 7 releases (reference 214) then applies (reference 216)) the brake in order to bring the rotor/wing 12 to a complete stop at exactly the correct orientation.

As shown in FIG. 5, once rotor/wing 12 has been brought to a complete stop, rotor/wing 12 may be locked in position by means of a mechanical lock, such as a spring-loaded plunger 56, which engages one of two slots 58A and 58B in the perimeter of brake disk 28 when moved into position by engagement servo 62. The mechanical lock may also provide for small adjustments in the final indexed position of rotor/wing 12 by extending or retracting the arm 64 of engagement servo 62 once spring-loaded plunger 56 has engaged brake disk 28. Depending upon the number of axial planes of symmetry of rotor/wing 12 greater or fewer than two slots 58A and 58B may be provided in brake disk 28 and active brake control apparatus 60 can be programmed in conventional fashion to stop rotor/wing at only one correct orientation, or at three or more correct orientations instead of the two correct orientations as discussed above. Furthermore, additional slots 58A and 58B may be provided in brake disk 28 and active brake control apparatus 60 can be programmed in conventional fashion to stop rotor/wing 12 at other desirable orientations, such as for stowing with blades 14 and 16 substantially aligned with longitudinal axis 18 of aircraft fuselage 20, or for higher speed flight with blades 14 and 16 positioned at an acute angle to longitudinal axis 18 of aircraft fuselage 20.

Although certain preferred embodiments and methods have been disclosed herein, it will be apparent from the foregoing disclosure to those skilled in the art that variations and modifications of such embodiments and methods may be made without departing from the spirit and scope of the invention. For example the controller may be programmed such that upon receipt of a deceleration command the controller immediately determines the instantaneous angular orientation of the rotor and applies the appropriate modulated braking force necessary to stop the rotor over the entire deceleration phase rather than in a two-phased approach. By applying a modulated braking force throughout the deceleration phase it is theoretically possible to reduce the peak braking torque and the commensurate wear and tear on the rotating components. Additionally, the present invention should not be limited to disk brakes in particular or even friction brakes in general. Non-friction braking means such as a regenerative electric brake or any other electronically controllable brake are considered within the scope of the present invention. Accordingly, it is intended that the invention shall be limited only to the extent required by the appended claims and the rules and principles of applicable law.

What is claimed is:

1. In combination with a rotor of a rotor/wing aircraft, an active rotor brake comprising:
   a brake apparatus operatively coupled to the rotor, said brake apparatus being capable of applying a variable decelerating torque to the rotor;
   a first sensor operatively coupled to the rotor, said first sensor having a first sensor output indicative of rotor angular displacement;
   an electronic control module having a control module input and a control module output, said control module input being operatively connected to said first sensor output and said control module output being operatively connected to said brake apparatus, said electronic control module receiving said first sensor output and outputting a control signal indicative of a desired deceleration torque, said control signal being operatively coupled to said brake apparatus to cause said brake apparatus to apply said desired deceleration torque; and
   a mechanical lock moveable between a first position in which said mechanical lock is disengaged from said rotor and a second position in which said mechanical lock engages said rotor thereby constraining said rotor against rotational displacement.

2. The active rotor brake of claim 1, further comprising:
   a second sensor operatively coupled to the rotor, said second sensor having a second sensor output indicative of rotor angular displacement, said second sensor output having a coarser resolution than said first sensor output.

3. The active rotor brake of claim 2, wherein:
   said first sensor output has a resolution of at least 2 degrees and said second sensor output has a resolution of no more than 180 degrees.

4. The active rotor brake of claim 2, wherein:
   said rotor/wing aircraft has a plurality of blades;
   said first sensor output has a fine resolution of approximately one signal pulse every 2 degrees of rotor angular displacement; and
   said second sensor output has a courser resolution of no more than one signal pulse per revolution for each of said plurality of blades.

5. The active rotor brake of claim 1, wherein said brake apparatus comprises a hydraulically actuated friction brake, said active rotor brake further comprising:
   a source of hydraulic pressure; and
   an electronically controlled hydraulic servo valve having a first port in fluid communication with said source of hydraulic pressure and a second port in fluid communication with said hydraulically actuated friction brake, said servo valve further comprising a control input operatively connected to said control module output for receiving said control signal and providing a modulated hydraulic pressure at said second port in response to said control signal, whereby said electronic control module is operatively coupled to said brake apparatus through said electronically controlled hydraulic servo valve.

6. The active rotor brake of claim 5, wherein:
   said hydraulically actuated friction brake comprises a disk brake assembly comprising a brake disk attached to said rotor and a brake caliper adapted to apply said deceleration torque to said brake disk.

7. The rotor brake of claim 1, further comprising:
   a slot formed along the surface of said rotor;
   wherein said mechanical lock comprises a spring-loaded plunger adapted to engage the slot in said rotor.

8. In combination with a rotor, an active brake for decelerating a shaft comprising:
   a brake apparatus, said brake apparatus comprising:
      a torque applying surface attached to the shaft;
      a friction lining having a surface moveable against said torque applying surface; and
      a piston for urging said friction lining against said torque applying surface;
   at least one sensor coupled to the rotor, said at least one sensor having at least one sensor output, said at least one sensor output being indicative of rotor angular displacement;
   an electronic control module having a control module input and a control module output, said control module input being operatively connected to said at least one sensor output and said control module output being operatively connected to said brake apparatus; and
   a mechanical lock moveable between a first position in which said mechanical lock is disengaged from said brake apparatus and a second position in which said mechanical lock engages said brake apparatus thereby constraining said torque applying surface against rotational displacement,
   said electronic control module including means for determining angular velocity and angular acceleration based on said at least one sensor output, said electronic control module further including means for determining a position error of said shaft and, in response to said position errors, determining a desired deceleration torque from said position error;
   said electronic control module outputting a control signal indicative of said desired deceleration torque, said control signal being operatively coupled to said brake apparatus to cause said brake apparatus to apply said desired deceleration torque.

9. A method of stopping and indexing a rotor of a rotor/wing aircraft to a predetermined angular position comprising:
   measuring the angular position of the rotor;
   determining the rotational velocity of the rotor;
   calculating, based on said angular position and said rotational velocity, the deceleration torque to be applied to the rotor necessary to stop the rotor at a desired angular orientation;
   applying said deceleration torque until the rotor stops at said desired angular orientation; and
   engaging a lock to constrain the rotor against rotational displacement.

10. The method of claim 9 further comprising:
   calculating an actual deceleration of said rotor;
   performing a comparison between said actual deceleration and a predicted deceleration based on said deceleration torque; and
   correcting said deceleration torque based on said comparison.

11. The active brake of claim 8, further comprising:
a plurality of slots formed along said torque applying surface,
wherein said mechanical lock comprises a spring-loaded plunger adapted to engage one of said plurality of slots in said torque applying surface.

12. The active rotor brake of claim 8, further comprising:
a second sensor operatively coupled to the rotor, said second sensor having a second sensor output indicative of rotor angular displacement, said second sensor output having a coarser resolution than said at least one sensor output.

13. The active rotor brake of claim 12, wherein:
said at least one sensor output has a resolution of at least 2 degrees and said second sensor output has a resolution of no more than 180 degrees.

14. The active rotor brake of claim 12, wherein:
said at least one sensor output has a fine resolution of approximately one signal pulse every 2 degrees of rotor angular displacement; and
said second sensor output has a courser resolution of no more than one signal pulse per revolution for said torque applying surface.

15. The active rotor brake of claim 8, wherein:
said brake apparatus further comprises:
a hydraulically actuated friction brake; and
said active brake further comprises:
a source of hydraulic pressure; and
an electronically controlled hydraulic servo valve having a first port in fluid communication with said source of hydraulic pressure and a second port in fluid communication with said hydraulically actuated friction brake, said servo valve further comprising a control input operatively connected to said control module output for receiving said control signal and providing a modulated hydraulic pressure at said second port in response to said control signal, whereby said electronic control module is operatively coupled to said brake apparatus through said electronically controlled hydraulic servo valve.

16. The active rotor brake of claim 15, wherein:
said hydraulically actuated friction brake comprises a brake caliper adapted to apply said desired deceleration torque to said friction lining.

17. The method of claim 9, wherein engaging the lock further comprises:
moving the lock from a first position in which the lock is disengaged from the rotor to a second position in which the lock engages the rotor thereby constraining the rotor against rotational displacement.

18. The method of claim 9, wherein engaging the lock further comprises:
engaging a spring-loaded plunger into a slot along the rotor.

* * * * *